Sept. 16, 1958 J. F. WOOD 2,852,619

PHONOGRAPH CARTRIDGE

Filed Sept. 23, 1955 4 Sheets-Sheet 1

Inventor
John F. Wood
By Alois W. Graf
Attorney

Inventor
John F. Wood
By Alois W. Graf
Attorney

Sept. 16, 1958 J. F. WOOD 2,852,619

PHONOGRAPH CARTRIDGE

Filed Sept. 23, 1955 4 Sheets-Sheet 3

Inventor
John F. Wood
By Alois W. Graf
Attorney

Sept. 16, 1958 J. F. WOOD 2,852,619

PHONOGRAPH CARTRIDGE

Filed Sept. 23, 1955 4 Sheets-Sheet 4

INVENTOR.
John F. Wood
BY
Alois W. Graf
Attorney

United States Patent Office 2,852,619

Patented Sept. 16, 1958

2,852,619

PHONOGRAPH CARTRIDGE

John F. Wood, Buchanan, Mich., assignor to Electro-Voice, Incorporated, Buchanan, Mich.

Application September 23, 1955, Serial No. 536,114

11 Claims. (Cl. 179—100.41)

The present invention relates to electromechanical transducing devices, and more particularly to phonograph cartridges of the turnover type.

This is a continuation-in-part of my copending patent application Serial No. 446,255, filed July 28, 1954, for an Electromechanical Transducer, and Serial No. 499,860, filed April 5, 1955, for Cartridge Case and Turnover Mechanism, now Patent No. 2,793,254.

The signal generating element of conventional phonograph cartridges is often a piezoelectric ceramic element, and the leads from the element are often soldered to the conductive surfaces thereof. In another conventional construction, the leads are connected to plates which are maintained in pressure contact with the conductive surfaces of the signal generating element by the force of a compliant rubber mounting pad. The assembling of phonograph cartridges of this type requires costly hand manipulations which it is desired to minimize.

Since the introduction of microgroove phonograph records, turnover phonograph cartridges have been provided with two different styli. Such styli have been of osmium or sapphire, which eventually becomes worn and must be replaced. At the present time about fifty different styli are stocked by servicemen to provide exact replacement needles or styli for the more commonly used phonograph cartridges.

When the owner of a phonograph cartridge becomes aware of improper phonograph reproduction, he concludes that a new stylus will remedy the deficiency and thus purchases one. In many instances the stylus is quite small, requiring a test of dexterity for replacement. Not infrequently the phonograph cartridge is damaged when a stylus is changed. In some instances the piezoelectric element may have changed its characteristics so that mere replacement of the stylus does not provide an adequate remedy. It is an object of the present invention to overcome certain of the aforementioned disadvantages by providing a novel turnover cartridge so that whenever the stylus appears to be worn or the cartridge appears to have changed characteristics, both cartridge and stylus may be replaced at a cost comparable to the present stylus replacement cost.

Further in accordance with the present invention, an improved cartridge having two styli is contained in a device less than one-fourth inch in diameter and about three-fourths inch long, which is not only economical but which has an improved operation characteristic.

Other objects and advantages of the invention will be apparent during the course of the following description when read in connection with the accompanying drawings, wherein.

Figure 7:
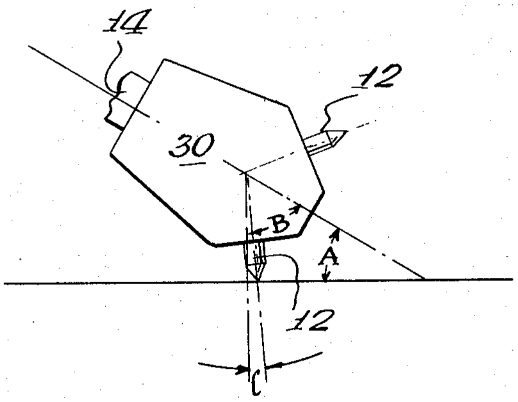
Figure 8:
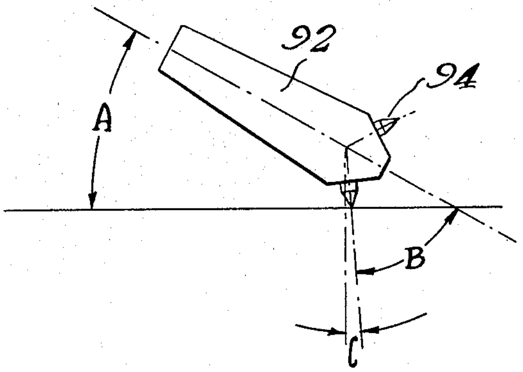
Figure 9:
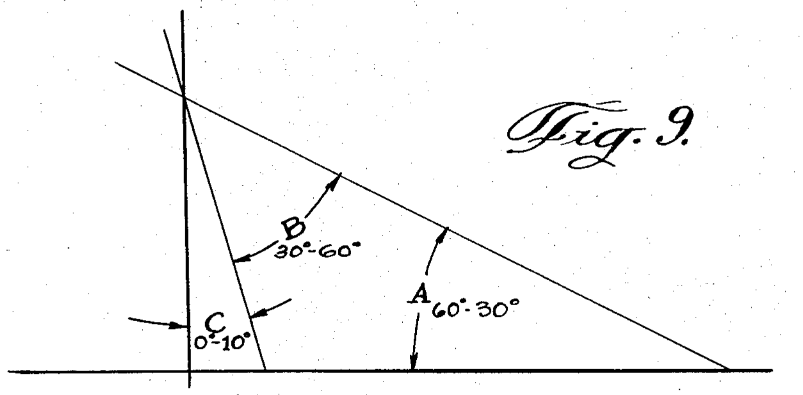

Figures 7, 8, and 9 are diagrammatic representations of certain ranges of variations in construction of the phonograph cartridges of the present invention.

Figure 1:
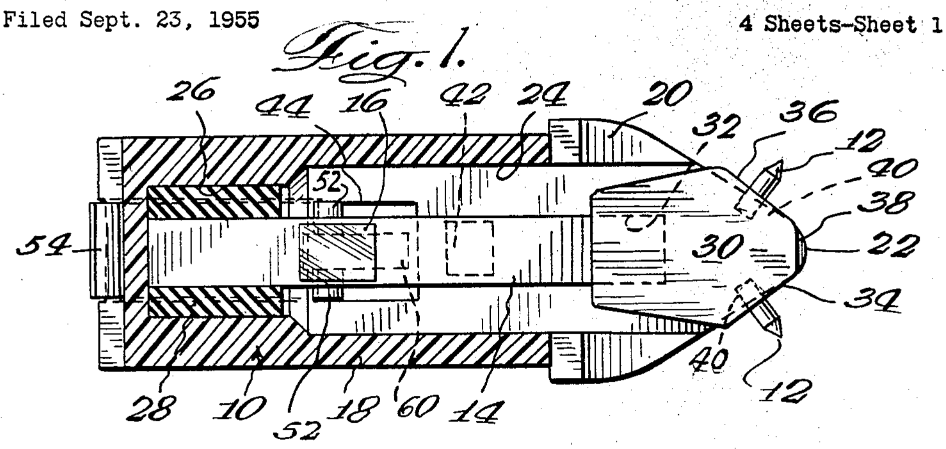
Figure 1 is a sectional view of one embodiment of a phonograph cartridge constructed according to the teachings of the present invention.
Figure 3:
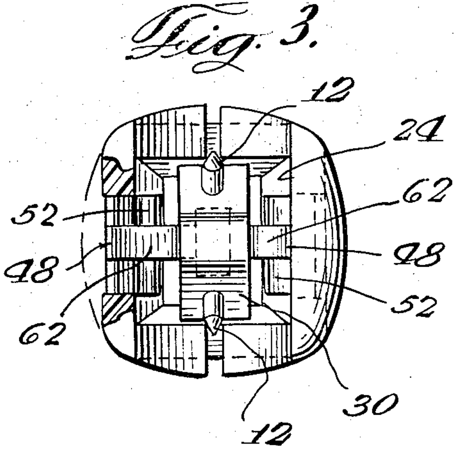
Figure 3 is a front elevational view of the phonograph cartridge as illustrated in Figure 1.
Figure 2:
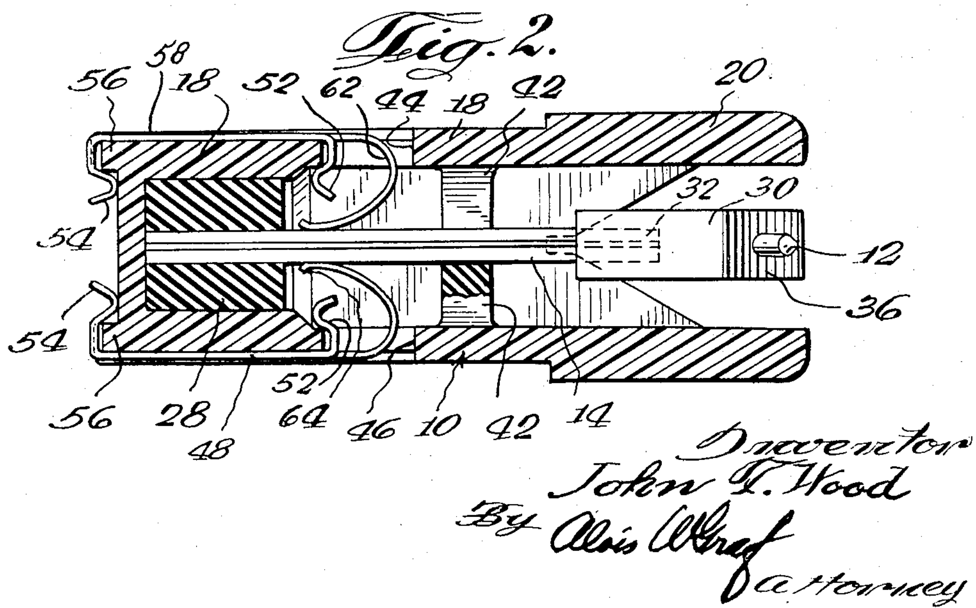
Figure 2 is a sectional view of the cartridge of Figure 1 taken normal to that of Figure 1.

The principal elements of the phonograph cartridge, as illustrated in the embodiment of Figures 1 through 3, are a housing 10, styli 12 supported within the housing 10 and extending to the exterior thereof, a signal producing or generating element 14, and means to make electrical contact with the surfaces of the signal generating element 14, namely contact members 16. Many types of signal generating elements 14 have been used in phonograph pickups. The present invention may be utilized with any type of signal generating element which provides electrically conducting surfaces which are suitable for terminals. In the case of quartz crystal elements or piezoelectric ceramic elements, opposite surfaces of the element become charged with the signal voltage, and the present invention is therefore clearly suitable to these types of elements. Also, the figures illustrate a pair of short bendless styli 12 attached to the signal generating element 14. It is also clear that the invention may be practiced with a single stylus, or with more than two styli, as the applications for the phonograph cartridge require.

The body 10 is constructed of an electrically insulating material, such as polyethylene plastic, and may be considered as having two adjacent portions 18 and 20, although it is to be understood that the body is constructed of a single unit. One of the portions may be termed the head 20 and contains the styli 12, and the other portion may be termed the base 18. The base 18 has a generally rectangular cross section throughout its length, and the head 20 has a slightly larger rectangular cross section in the region adjacent to the base 18. The head 20 however is generally wedge shaped and tapers to a point 22. A rectangular cavity 24 extends into the body 10 from the point 22 of the head 20. The cavity 24 does not extend through the body 10, but stops adjacent to the end 26 opposite to the head 20. This end 26 of the cavity 24 has a smaller cross section than the rest of the cavity 24. The signal generating element 14 is inserted into the body 10 through the mouth of the cavity 24, and it is secured axially therein by a compliant body or sleeve 28 which is snugly disposed between the base 18 and the signal generating element 14 in the end portion 26 of the cavity 24. In the particular construction of the phonograph cartridge which is to be described in detail throughout the present portion of this disclosure, the compliant sleeve 28 is constructed of rubber and is cemented to the signal generating element 14 and to the base 18 of the body 10. A rigid stylus-supporting member 30 in the form of a block having greater cross-sectional dimensions than those of the element 14 is attached to the opposite end of the signal generating element 14 by means of a recess 32 into which the signal producing element 14 is embedded and secured, as by cement. The stylus supporting member 30 is a flat member provided with a pair of surfaces on opposite sides of the axis of the signal generating element 14 tapering toward that axis, these surfaces being designated 34 and 36. The end surface 38 of the member 30 adjacent to the point 22 of the head 20 of the body 10 is disposed normal to the axis of the signal generating element 14 and intersects the tapered surfaces 34 and 36. The styli 12 are disposed centrally in the surfaces 34 and 36, and are set in recesses 40 in the member 30. The two styli 12 are disposed normally to the tapered surfaces 34 and 36 which are disposed at an angle of 35 degrees relative to the axis of the signal generating element 14, and are substantially coterminous with the wedge-shaped extensions, the tips of the styli extending out therebetween.

Damping bars 42 extend from the base 18 of the body 10 to the signal generating element 14 about midway between the styli mounting member 30 and the resilient sleeve 28. Each damping bar 42 is also constructed of resilient material, such as rubber. Each damping bar 42 is disposed normal to the axis of the signal generating element 14 and roughly parallel to the signal produced displacement of the signal generating element 14.

The base 18 of the body 10 is provided with a pair of apertures 44 and 46 on opposite sides of the signal producing element 14. A pair of spring contact elements 48 traverse the apertures 44 and 46, and contact the surfaces of the signal generating element 14 which become electrically charged responsive to the displacement of the stylus 12. It is to be noted that in the case of piezoelectric crystals, the surfaces which generate the potential responsive to the displacement are normal to the displacement, and hence normal to the styli. Each of the spring contacts 48 is secured in position by means of a pair of hooks 52 and clip 54 which are disposed at opposite ends of the contacts 48. The hooks 52 extend about the apertures 44 and 46 into the cavity 24, and the clips 54 extend over protruding ribs 56 at the end of the body 10 to secure the contacting elements 48 in position.

Each spring contact 48 has a flat elongated central portion 58 which is longitudinally divided into three strips at one end, the outer two strips being bent into an acute angle relative to the central portion, forming the hooks 52. The central strip, designated 60, extends outwardly from the hooks 52 and is bent to have a curved portion 62, followed by a substantially straight portion. The end 64 of the straight portion has a small curvature. The flat portion adjacent the end 64 is disposed in pressure contact with the plated contact area 16 of signal generating element 14. This occurs near the compliant support 28 where the element 14 has a minimum of motion. The contacting elements 48 are constructed of resilient electrically conducting material and may be used to make electrical contact from the signal generating element 14 to other portions of the circuit, either by a pressure fit against the spring contacts 48 or by connecting the contacts 48 to terminals of any conventional type. It is to be noted that the spring contacts 48 contact the signal generating element 14 in its region of smallest excursion, that is, in the region of the signal producing element 14 which undergoes the least excursion for a given displacement of the stylus 12. In this manner, the spring contacts do not appreciably affect the characteristic electrical operation of the signal generating element 14 when the signal generating element 14 is constructed of piezoelectric materials.

A phonograph cartridge constructed in the manner described above may be assembled as follows. The styli 12 are first inserted into the recesses 40 in the styli holding member 30 and secured therein. The styli holding member 30 is thereupon attached to the end of the signal generating element 14 by cementing the end of the element 14 into the recess 32 in the member 30. Next, the resilient sleeve 28 and the snubbing bars 42 are attached to the signal generating element 14 in the proper places, as by cement, and the entire assembly is then inserted into the cavity 24 of the body 10. Before inserting this assembly into the cavity, the restricted portion 26 of the cavity is coated with cement so that the resilient sleeve 28 will be secured within the body 10. In like manner, the two resilient bars 42 are attached to the body 10. At this point, all that remains to be done is to snap the spring contacts 48 into the apertures 44 and 46 and about the protruding ribs 56.

Figure 4:
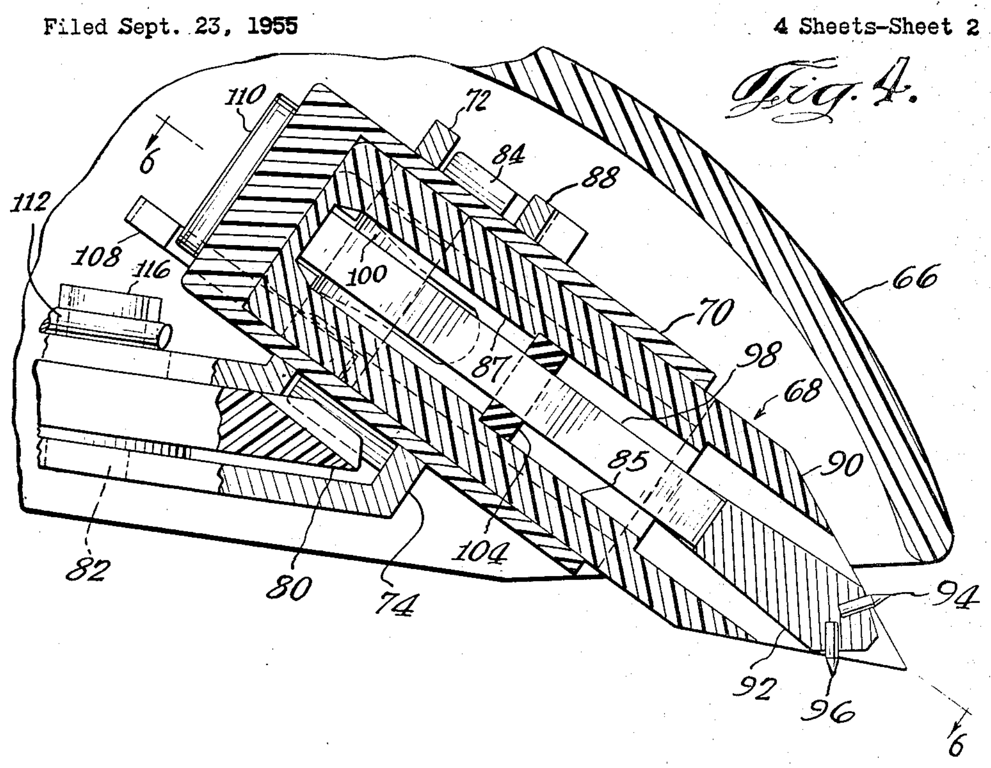
Figure 4 is a cross-sectional view of the tone arm, cartridge case and turnover mechanism assembly which constitutes another embodiment of this invention.

Referring now more particularly to Figure 4, there is shown a tone arm 66 within which is mounted a similar but modified cartridge case 68. The cartridge case 68 is positioned within a sleeve 70 which is rotatably mounted at an acute angle with respect to the tone arm in a bracket consisting of a top plate 72 and a bottom plate 74. The top plate 72 and the bottom plate 74 form a mounting bracket and are mounted with their mounting portions in the normal operating plane of motion of the tone arm on a boss 76, which is an integral part of the tone arm 66. The boss 76 lies substantially in the normal operating plane of motion of the tone arm 66. The turnover mechanism for the sleeve 70 consists of a gear 80 which is mounted to rotate on a pin 82 between the top and bottom plates 72 and 74. The gear 80 engages mating teeth 84 fixed around the periphery of the sleeve 70. Rotation of the gear 80 may be effected by turning a handle, not shown, attached to the lower surface of the gear 80. A stop 88 is provided in the bottom plate 74 and cooperates with certain of the teeth 84 to limit rotation of the cartridge case and sleeve to 180°. This is accomplished by elongating at least two of the teeth 84, which are so spaced that their surfaces contacting stop 88 are 180° apart. In the present embodiment, all of the teeth intermediate these two elongated teeth are also elongated to slightly less than the width of the gap between the top and bottom plates 72 and 74.

Figure 5:
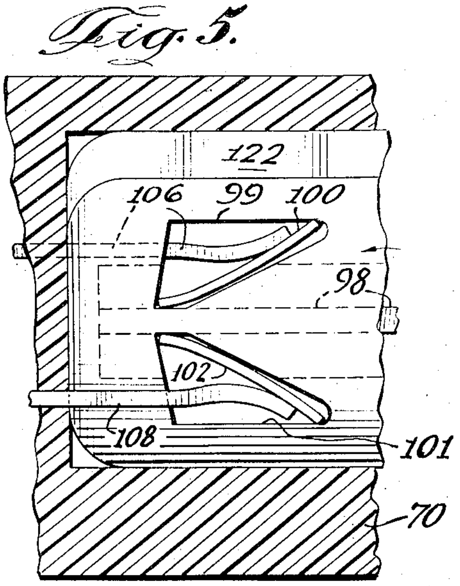
Figure 5 is a broken away view of the cartridge case in its rotatable sleeve showing details of the contact blade and piezoelectric element assembly.
Figure 6:
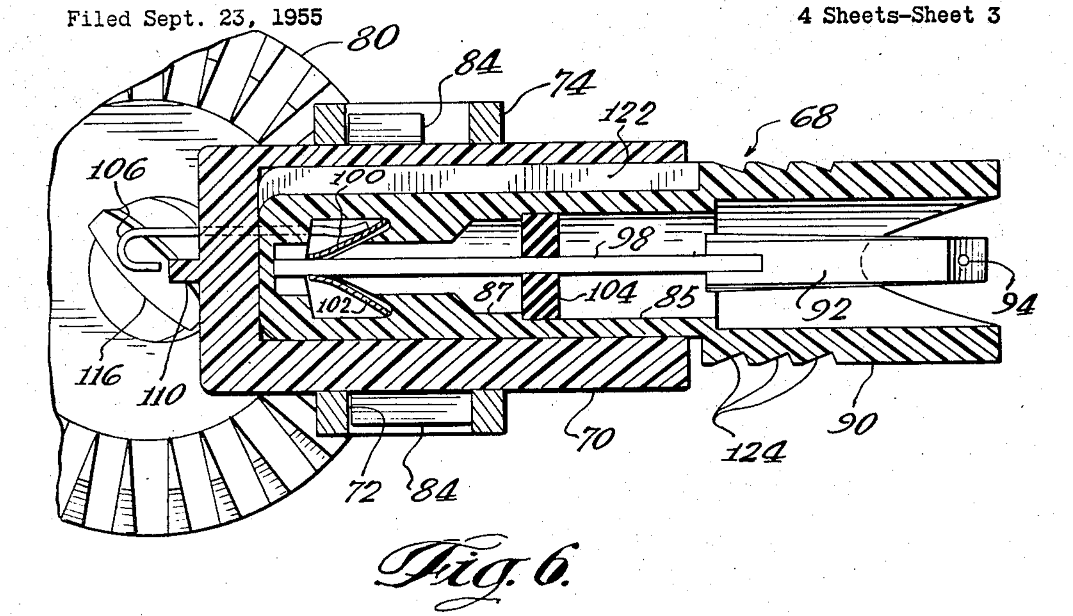
Figure 6 is a cross-sectional view taken at 6—6 of Figure 4.

Referring now to Figures 4 and 5 for details of the cartridge case structure, there is shown a cartridge housing 90, which may be made of a plastic material, within which are contained the essential cartridge elements. A needle cap or stylus supporting block 92 at one end of the housing 90 mounts, in one preferred embodiment, two styli 94, 96 having 1 mil and 3 mil tips, respectively. These correspond to the grooves of long playing and regular phonograph records. A piezoelectric element 98 is connected at one end to the needle cap 92 and hinged, as it were, at its other end between two tilted rectangular contacts 100 and 102. A damping pad 104 made of rubber or the like surrounds element 98 at an intermediate location. The contact blades 100 and 102 are respectively inserted in triangular recesses 99 and 101 in the cartridge case. The blades 100 and 102 make electrical contact with contacts 106 and 108, respectively, which extend through the sleeve 70. This is effected by a wiping action of the blades 100, 102, which extend all the way across the contacts 106 and 108, as the cartridge 90 is inserted into the sleeve 70 to deflect the blades 100, 102 against the sleeve contacts 106, 108. The angular position of these contact blades facilitates insertion of the cartridge case 68, and at the same time prevents accidental loosening of the case due to vibration. The sleeve contacts 106 and 108 extend through the sleeve 70, are slightly twisted to lock them in place, and are then bent over adjacent a rectangular protrusion 110 of the sleeve 70 to connect to wire conductors, as is well known in the art.

The hinged support of the piezoelectric element 98 by the contact members 100 and 102 has several advantages. It eliminates the rubber pad at the end of the element 98, which is employed in the corresponding portion of the assembly previously described. The contact members 100 and 102 not only provide electrical contact with opposite sides of the element 98, but also provide an arrangement which improves the response characteristic of the element. The elements 100 and 102 also provide convenient electrical contacts which make sliding or wiping contacts with the two cooperating contacts 106 and 108 in the support sleeve 70. It will be noted that the damping pad 104 is accurately positioned by having it engage a shoulder formed where the two different diameter bores 85 and 87 of the case 28 meet. Thus, again provision has been made for rapid mass production assembly of the cartridge and styli.

It also may be noted that the open end of the casing 90 is defined by two planes at an acute angle to each other which intersect at the axis of the casing. Thus, two acute angled extremities are located adjacent the styli 94 and 96 the element 98 being disposed in the plane which is between these extensions. Thus, if the cartridge is dropped on the record, no damage occurs because the extremities are engaged and preclude bending the element 98 beyond a predetermined safe amount.

In operation, signals recorded on a phonograph record are picked up by the appropriate stylus 94 or 96 and converted from mechanical to electrical energy by the piezoelectric element 98. The electrical signal is then conducted from blades 101 and 102 to the externally accessible contacts 106 and 108. To position the cartridge from its regular speed needle tip position to its long playing speed needle tip position, the sleeve 70 is rotated by means of the gear 80 previously discussed. These two needle tip positions are accurately maintained by a spring 112 which is fixed to the top plate 72. The spring 112 engages a positioning wheel 116 which is fixed to the pin 82 mounting the gear 80.

It should be noted that the cartridge case 70 is provided with a key 122 which engages a mating slot in the sleeve 70, and the cartridge case is, therefore, accurately positioned in said sleeve. To facilitate the insertion and withdrawal of the cartridge case in its sleeve, grips 124 are provided in the casing surface.

Reference now may be had to Figures 7, 8, and 9 of the drawings. From this it will be noted that a portion of the embodiment such as shown in Figure 1 has been represented relative to the normal position which it would have when reproducing a phonograph record. In the particular embodiment shown, the stylus 12 is at an angle B with respect to the center line passing through the piezoelectric element 14. The center line of the piezoelectric element 14 and the member 30 is at an angle A with respect to the phonograph record. In the particular embodiment from which representation in Figure 7 has been taken, the angle B is 60°. The angle A preferably is less than 30°, so that the sum of the angles A and B is less than 90°. With such relation, the axis of the stylus 12 leaves an angle C, which preferably varies from 0 to 10°, thus giving preferably a positive rake relative to the movement of the phonograph record.

The arrangement shown in Figure 8 corresponds to the construction shown in Figure 4. In this particular embodiment the angle A is 28°, and the angle B is 54°. This thus leaves the angle C approximately 8°.

From the representations in Figures 7 and 8, it will be appreciated that considerable latitude is permissible with respect to the angle of the body of the piezoelectric element with respect to the turntable, and further considerable latitude is permissible as to the manner in which the styli are positioned. This has been further amplified by a representation in Figure 9 which shows that the angle B may vary from 30° to 60°, and that the angle A may vary from 60° to less than 30°, and that the angle C may range from 0° to 10°.

While there has been shown and described an invention in connection with certain specific embodiments, it will, of course, be understood that it is not intended nor wished to be limited thereto since it is apparent that the principles herein disclosed are susceptible of numerous other applications, and modifications may be made in the structural arrangement and in the instrumentalities employed without departing from the spirit and scope of this invention as set forth in the appended claims.

I claim as my invention:

1. A phonograph cartridge comprising a casing having a cavity extending therein from an opening, an elongated piezoelectric element disposed within said cavity having one end confronting the opening, means comprising a compliant body disposed between the casing and portions of the element remote from the opening for resiliently mounting the element to the casing, two short rigid styli, a body rigid in all directions with respect to the axis of elongation of the element directly mounted on the end of the element confronting the opening and to the styli, said body forming an axial extension of the element and mounting the styli on opposite sides of said axis at approximately equal distances therefrom and equal angles between 25 and 60 degrees thereto.

2. A phonograph cartridge assembly comprising a mounting bracket having a mounting portion adapted to be secured to the end of a tone arm substantially in the normal operating plane of motion of the tone arm, a cartridge holder, means interconnecting the cartridge holder and the bracket for mounting the cartridge holder for rotational motion about an axis at an acute angle with respect to the mounting portion of the bracket, and a cartridge extending axially within the holder and having an axially extending elongated piezoelectric element, means comprising a body of compliant material mounted between a portion of the element remote from the outer end thereof and a portion of the casing confronting said portion of the element for resiliently mounting the element to the casing, a pair of short bendless styli, and means on the outer end of the element for securing the styli at opposite equal acute angles with respect to the axis of rotation of the holder, said stylus mounting means being rigid in all directions with respect to the axis of elongation of the element.

3. A phonograph cartridge assembly comprising a cartridge having an elongated signal-generating element, styli mounted on the outer end of said element at equal acute angles with respect to the direction of extension thereof, mounting means comprising a compliant body mounted between a portion of the generating element remote from the styli and a portion of the casing confronting said portion of the generating element, a cartridge holder in which the cartridge is mounted, and mounting means for the cartridge holder including means for rotating the cartridge about the direction of extension of the element, and a bracket having a mounting portion adapted to be mounted substantially in the plane of ordinary operating motion of a tone arm, the direction of extension of the element forming an acute angle with the mounting portion of the bracket, the sum of each of the first-mentioned acute angles and the latter acute angle being less than a right angle.

4. A phonograph cartridge assembly comprising a mounting bracket having a mounting portion adapted to be secured to the end of a tone arm substantially in the normal operating plane of motion of the tone arm, a cartridge holder having an axially extending sleeve, said sleeve having contact members therein, means interconnecting the cartridge holder and the bracket for mounting the cartridge holder for rotational motion about an axis at an acute angle with respect to the mounting portion of the bracket, and a two-stylus phonograph cartridge within the sleeve comprising an elongated hollow insulating casing open at one end and closed at the other end, the open end having substantially identical symmetrically tapered centrally pointed opposed extensions thereon, an elongated rectangular ceramic piezoelectric element, means within the closed end portion of the casing to mount the element longitudinally within the casing in a plane lying centrally between said opposed extensions and with the free end thereof in the outer end portion of the casing, a unitary rigid stylus-mounting block on said free end of the element having a tapered outer end portion substantially coterminous with the edges of the extensions on the casing, the free end of the element being embedded in the inner end portion of the mounting block, short bendless styli embedded in opposite surfaces of the tapered outer end portion of the mounting block at opposite equal angles of between 30 degrees and 60 degrees with respect to the direction of extension of the piezoelectric element and extending out from between the extensions on the casing, at least the central longitudinal portion of the casing having straight outer sides adapted to slide into the cartridge holder and being keyed to define a single orientation with respect to the cartridge holder, and conducting contact members in contact with opposite faces of the element adjacent to the inner end thereof and extending through the casing and longitudinally along the outer surfaces thereof to conduct generated signals to the contact members in the cartridge holder.

5. A two-stylus phonograph cartridge for use in a tone arm having thereon a cartridge holder mounted for rotational motion about an axis at an acute angle with respect to the normal operating plane of motion of the tone arm, and having an axial opening adapted to slidingly receive a cartridge and contact members within the opening, said cartridge comprising an elongated hollow insulating casing open at one end and closed at the other end, the open end having substantially identical symmetrically tapered centrally pointed opposed extensions thereon, an elongated flat rectangular ceramic piezoelectric element, means within the closed end portion of the casing to mount the element longitudinally within the casing in a plane lying centrally between said opposed extensions and with the free end thereof in the outer end portion of the casing, a unitary rigid stylus-mounting block on said free end of the element and having a tapered outer end portion substantially coterminous with the edges of the extensions on the casing, the free end of the element being embedded in the inner end portion of the mounting block, short bendless styli embedded in opposite surfaces of the tapered outer end portion of the mounting block at opposite equal angles of between 30 degrees and 60 degrees with respect to the longitudinal direction of extension of the piezoelectric element and extending out from between the extensions on the casing, at least the central longitudinal portion of the casing having straight outer sides adapted to slide into the cartridge holder and being keyed to define an orientation with respect to the cartridge holder, and conducting contact members in contact with opposite faces of the element adjacent to the inner end of the element and extending through the casing and longitudinally along the outer surface thereof to conduct generated signals to the cartridge holder.

6. A two-stylus phonograph cartridge for use in a tone arm having thereon a cartridge holder mounted for rotational motion about an axis at an acute angle with respect to the normal operating plane of motion of the tone arm and having an axial opening adapted to slidingly receive a cartridge and contact members within the opening, said cartridge comprising an elongated hollow insulating casing open at one end and closed at the other end, the open end having substantialy identical tapered opposed extensions thereon, an elongated rectangular piezoelectric element, a compliant body mounted between the closed end portion of the casing and the element to resiliently mount the element longitudinally within the casing in a plane lying between said opposed extensions and with the free end thereof in the outer end portion of the casing, a single rigid stylus-mounting member on said free end of the element having an outer end portion substantially coterminous with the edges of the extensions on the casing, the free end of the element being embedded in the inner end portion of the mounting member, short bendless styli embedded in opposite surfaces of the outer end portion of the mounting member at opposite equal acute angles with respect to the longitudinal direction of extension of the piezoelectric element and extending out from between the extensions on the casing, at least a longitudinal portion of the casing having straight outer sides adapted to slide into a cartridge holder and being keyed to define an orientation with respect to the cartridge holder, and conducting contact members in contact with opposite faces of the element adjacent to the inner end thereof and extending through the casing and longitudinally along the outer surface thereof to conduct generated signals to a cartridge holder in which the cartridge may be placed.

7. A two-stylus phonograph cartridge for use in a tone arm having thereon a cartridge holder mounted for rotational motion about an axis at an acute angle with respect to the normal operating plane of motion of the tone arm and having an axial opening adapted to slidingly receive a cartridge, said cartridge comprising a hollow plastic casing open at one end and closed at the other end, the open end having identical symmetrically tapered centrally pointed opposed extensions thereon, a motion-responsive signal-generating element, a compliant body mounted between the closed end portion of the casing to mount the signal-generating element within the casing and the element with the free end thereof in the outer end portion of the casing, a single rigid stylus-mounting member on the free end of the element and having an outer end portion substantially coterminous with the edges of the extensions on the casing, and short bendless styli embedded in opposite surfaces of the outer end portion of the mounting member at opposite equal acute angles with respect to the axis of the casing and having at least the tips thereof extending out from between the extensions on the casing.

8. A two-stylus phonograph cartridge for use in a tone arm having thereon a cartridge holder mounted for rotational motion about an axis at an acute angle with respect to the normal operating plane of motion of the tone arm and having an axial opening adapted to slidingly low insulating casing open at one end and closed at the other end, the open end having substantially identical symmetrically tapered opposed extensions thereon, an elongated flat rectangular ceramic piezoelectric element, means within the closed end portion of the casing to resiliently mount the element longitudinally within the casing in a plane lying centrally between said opposed extensions and with the free end thereof in the outer end portion of the casing, a unitary rigid stylus-mounting block of greater transverse dimensions than the element on said free end of the element and having a tapered outer end portion substantially coterminous with the edges of the extensions on the casing, the free end of the element being embedded in the inner end portion of the mounting block, short bendless styli embedded in opposite surfaces of the tapered outer end portion of the mounting block at opposite equal angles of between 30 degrees and 60 degrees with respect to the longitudinal direction of extension of the piezoelectric element and extending out from between the extensions on the casing, at least the central longitudinal portion of the casing having straight sides adapted to slide into a cartridge holder and being keyed to define a single orientation with respect to the cartridge holder, and conducting contact members in contact with opposite faces of the element.

9. A two-stylus phonograph cartridge for use in a tone arm having thereon a cartridge holder mounted for rotational motion about an axis at an acute angle with respect to the normal operating plane of motion of the tone arm, said cartridge comprising a casing open at the outer end, an elongated flat rectangular piezoelectric element, means at the inner end of the casing to mount the element longitudinally within the casing including a compliant body mounted between a portion of the element and a portion of the casing confronting said portion of the element, a single rigid stylus-mounting member on the outer end portion of the element, said stylus mounting being rigid in all directions with respect to the axis of elongation of the element, the outer end portion of the element being embedded in the inner end portion of the mounting member, and short bendless styli embedded in the mounting member at opposite equal acute angles with respect to the direction of extension of the element.

10. A phonograph cartridge comprising a casing having a cavity extending therein from an opening, an elongated piezoelectric element disposed within said cavity having one end confronting the opening, means comprising a compliant body disposed between the casing and portions of the element remote from the opening for resiliently mounting the element to the casing, a short rigid stylus, a body rigid in all directions with respect to the axis of elongation of the element directly mounted to the end of the element confronting the opening and to the stylus, said body forming an axial extension to the element and mounting the stylus at an acute angle relative to the extension of the element.

11. A phonograph cartridge comprising a casing having a cavity extending therein from an opening, a rectangular elongated piezoelectric element disposed within said cavity having one end confronting the opening, means comprising a compliant body mounted between the casing and confronting portions of the element for resiliently mounting the element to the casing, said portions of the element being remote from the opening, two short rigid styli, a body rigid in all directions with respect to the axis of elongation of the element directly mounted on the end of the element confronting the opening and to the styli, said body forming an extension to the longitudinal axis of the element and mounting the styli on opposite sides of the longitudinal axis of the element at approximately equal distances therefrom and equal acute angles thereto, said styli being disposed parallel to the transverse axis of the element, and resilient pads disposed between the surfaces of the element parallel to the styli between the mounting means and the styli and abutting the casing.

References Cited in the file of this patent

UNITED STATES PATENTS

| | | |
|---|---|---|
| 2,106,051 | Dunning | Oct. 3, 1939 |
| 2,699,470 | Koren | Jan. 11, 1955 |
| 2,702,317 | Palo et al. | Feb. 15, 1955 |
| 2,717,929 | Klingener | Sept. 13, 1955 |
| 2,742,530 | Mayer | Apr. 17, 1956 |
| 2,825,763 | De Vries | Mar. 4, 1958 |

FOREIGN PATENTS

| | | |
|---|---|---|
| 708,091 | Great Britain | Apr. 28, 1954 |

UNITED STATES PATENT OFFICE

CERTIFICATE OF CORRECTION

Patent No. 2,852,619 September 16, 1958

John F. Wood

It is hereby certified that error appears in the printed specification of the above numbered patent requiring correction and that the said Letters Patent should read as corrected below.

Column 8, line 15, after "casing" insert -- and the element --; line 17, strike out "and the element"; line 31, strike out "and having an axial opening adapted to slidingly" and insert instead -- , said cartridge comprising an elongated hol- --.

Signed and sealed this 2nd day of December 1958.

(SEAL)
Attest:

KARL H. AXLINE

Attesting Officer

ROBERT C. WATSON
Commissioner of Patents